US009317587B2

(12) United States Patent
Dahn et al.

(10) Patent No.: US 9,317,587 B2
(45) Date of Patent: Apr. 19, 2016

(54) SYSTEMS, METHODS, INTERFACES AND SOFTWARE FOR EXTENDING SEARCH RESULTS BEYOND INITIAL QUERY-DEFINED BOUNDARIES

(75) Inventors: Michael Dahn, Farmington, MN (US); Khalid Al-Kofahi, Rosemount, MN (US); Peter Jackson, Burnsville, MN (US)

(73) Assignee: Thomson Reuters Global Resources (CH)

(*) Notice: Subject to any disclaimer, the term of this patent is extended or adjusted under 35 U.S.C. 154(b) by 1550 days.

(21) Appl. No.: 11/028,476

(22) Filed: Jan. 3, 2005

(65) Prior Publication Data
US 2005/0228788 A1 Oct. 13, 2005

Related U.S. Application Data

(60) Provisional application No. 60/533,819, filed on Dec. 31, 2003.

(51) Int. Cl.
*G06F 17/30* (2006.01)

(52) U.S. Cl.
CPC ........ *G06F 17/3066* (2013.01); *G06F 17/3069* (2013.01); *G06F 17/30722* (2013.01); *G06F 17/30864* (2013.01)

(58) Field of Classification Search
USPC .......................................... 707/706, 722, 739
See application file for complete search history.

(56) References Cited

U.S. PATENT DOCUMENTS

| 4,754,489 A | 6/1988 | Bokser |
| 4,814,746 A | 3/1989 | Miller |
| 4,876,731 A | 10/1989 | Loris et al. |
| 5,062,143 A | 10/1991 | Schmitt |

(Continued)

FOREIGN PATENT DOCUMENTS

| WO | WO-9833131 A1 | 7/1998 | |
| WO | WO00/77690 A1 * | 12/2000 | .............. G06F 17/30 |

(Continued)

OTHER PUBLICATIONS

Riloff, E., et al., "Information Extraction as a Basis for High-Precision Test Classification", *ACM Transactions on Information Systems, Association for Computing Machinery*, 12 (3), (Jul. 1, 1994),296-333.

(Continued)

*Primary Examiner* — Cam-Linh Nguyen
(74) *Attorney, Agent, or Firm* — Duncan Galloway; Egan Greenwald, PLLC; Kevin T. Duncan (57) ABSTRACT

To facilitate legal research, companies, such as Thomson West provide subscription-based online information-retrieval systems. Seeking to improve these and related IR systems, the present inventors recognized researchers often overlook some types of documents, such as legal encyclopedias and treatises that may be useful to them. Accordingly, the present inventors devised systems, methods, and software that automatically search for other types of documents not specifically targeted by user queries. One exemplary system automatically submits a user query for legal opinions to first and second databases, with the first storing legal opinions and the second storing non-opinion documents, such as headnotes from the West Key Number System, articles from American Law Reports, and/or articles from American Jurisprudence.

40 Claims, 8 Drawing Sheets

(56) References Cited

U.S. PATENT DOCUMENTS

| | | | |
|---|---|---|---|
| 5,075,896 | A | 12/1991 | Wilcox |
| 5,151,950 | A | 9/1992 | Hullender |
| 5,625,767 | A | 4/1997 | Bartell et al. |
| 5,640,553 | A | 6/1997 | Schultz |
| 5,703,964 | A | 12/1997 | Menon et al. |
| 5,724,575 | A | 3/1998 | Hoover et al. |
| 5,751,850 | A | 5/1998 | Rindtorff |
| 5,818,952 | A | 10/1998 | Takenouchi et al. |
| 5,873,076 | A | 2/1999 | Barr et al. |
| 5,970,490 | A | 10/1999 | Morgenstern |
| 5,983,214 | A | 11/1999 | Lang |
| 5,983,216 | A | 11/1999 | Kirsch |
| 5,987,454 | A | 11/1999 | Hobbs |
| 6,012,053 | A | 1/2000 | Pant |
| 6,018,733 | A | 1/2000 | Kirsch et al. |
| 6,029,161 | A | 2/2000 | Lang et al. |
| 6,070,158 | A | 5/2000 | Kirsch et al. |
| 6,108,686 | A * | 8/2000 | Williams, Jr. ............. 709/202 |
| 6,112,203 | A | 8/2000 | Bharat et al. |
| 6,137,911 | A | 10/2000 | Zhilyaev |
| 6,208,988 | B1* | 3/2001 | Schultz ............. G06F 17/30616 |
| 6,226,632 | B1 | 5/2001 | Takahashi et al. |
| 6,249,784 | B1 | 6/2001 | Macke et al. |
| 6,253,239 | B1 | 6/2001 | Shklar et al. |
| 6,393,415 | B1 | 5/2002 | Getchius et al. |
| 6,460,029 | B1 | 10/2002 | Fries et al. |
| 6,510,406 | B1* | 1/2003 | Marchisio ............. 704/9 |
| 6,523,022 | B1 | 2/2003 | Hobbs |
| 6,591,261 | B1* | 7/2003 | Arthurs ............. 707/2 |
| 6,633,873 | B1* | 10/2003 | Nakamura ............. 707/10 |
| 6,668,255 | B2* | 12/2003 | Mielenhausen ............. 707/100 |
| 7,139,755 | B2 | 11/2006 | Hammond |
| 7,483,878 | B2* | 1/2009 | Martin et al. ............. 707/3 |
| 2002/0052871 | A1 | 5/2002 | Chang et al. |
| 2002/0059204 | A1* | 5/2002 | Harris ............. 707/3 |
| 2002/0077944 | A1* | 6/2002 | Bly et al. ............. 705/35 |
| 2002/0078230 | A1 | 6/2002 | Hals et al. |
| 2003/0088547 | A1 | 5/2003 | Hammond |
| 2003/0097357 | A1 | 5/2003 | Ferrari et al. |
| 2003/0187834 | A1 | 10/2003 | Oda et al. |
| 2005/0149343 | A1* | 7/2005 | Rhoads et al. ............. 705/1 |
| 2005/0149500 | A1* | 7/2005 | Marmaros et al. ............. 707/3 |

FOREIGN PATENT DOCUMENTS

| | | |
|---|---|---|
| WO | WO-0077690 A1 | 12/2000 |
| WO | WO-0291229 A2 | 11/2002 |
| WO | WO-03040875 A2 | 5/2003 |
| WO | WO-2005/066849 A2 | 7/2005 |
| WO | WO-2005066849 A3 | 7/2005 |

OTHER PUBLICATIONS

Schutze, H., et al., "A Cooccurrence-based Thesaurus and two Applications to Information Retrieval", *Information Processing & Management*, 33(3), (May 1997), 307-318.

Application Serial No. 05704889.4, Final Office Action mailed Jun. 18, 2007, 4 p.

U.S. Appl. No. 09/992,979, Final Office Action mailed Feb. 11, 2005, 39 p.

U.S. Appl. No. 09/992,979, Non-Final Office Action mailed Mar. 11, 2004, 11 p.

U.S. Appl. No. 09/992,979, Response filed Aug. 11, 2005 to Final Office Action mailed Feb. 11, 2005, 38 p.

U.S. Appl. No. 09/992,979, Response filed Sep. 13, 2004 to Non-Final Office Action mailed Mar. 11, 2004, 16 p.

Canadian Application Serial No. 2562490, Final Office Action mailed Aug. 14, 2006, 1 p.

New Zealand Application Serial No. 548445, First Office Action mailed Apr. 27, 2007, 3 p.

European Application Serial No. 98934144.1, Non Final Office Action mailed Jun. 30, 2005, 1 p.

Canadian Application Serial No. 2562490, Response filed Oct. 25, 2006 to Non-Final Office Action mailed Aug. 14, 2006, 2 p.

European Application Serial No. 98934144.1, Response filed Jul. 30, 2005 to Non-Final Office Action mailed Jun. 30, 2005, 1 p.

European Application Serial No. 98934144.1, Response filed Mar. 6, 2006 to Non-Final Office Action mailed Aug. 25, 2005, 13 p.

*AltaVista—The Search Company Homepage*, http://web.archive.org/web/20011031190455/http://www.altavista.com/, (Oct. 31, 2001), 2 pgs.

*Northern Light Power Search*, http://web.archive.org/web/20001018000000-20001018235959/http://www.northernlight.com, (Oct. 18, 2000), 5 pgs.

*Westlaw Sign-On*, http://web.archive.org/web/20001018-re/http://www.westlaw.com, (Oct. 18, 2000), 2 pgs.

*AltaVista—The Search Company*, http://web.archive.org/web/20001017-re/http://www.altavista.com, (Oct. 17, 2000), 2 pgs.

*Yahoo!*, http://web.archive.org/web/20001027re/http://www.yahoo.com, (Oct. 27, 2000), 2 pgs.

"Excite Search Results for "protein"", 1-2.

"Infomine Scholarly Internet Resource Collections", *Protein*, Search results for Protein, 1-14.

"The Protein Information Resource:PIR-International Protein Sequence Database", *Resource Details*, 1-2.

Mason, Julie, et al., "Infomine: Promising Directions in Virtual Library Development", 1-10.

Members of the Clever Project, "Hypersearching the Web", (Jun. 1999), 1-9.

Schatz, Bruce R., "Information Retrieval in Digital Libraries: Bringing Search to the Net", *Science*, 275 (Jan. 17, 1997), 327-334.

"U.S. Appl. No. 11/457,374, Preliminary Amendment mailed Jul. 13, 2006", 4 pgs.

"International Application Serial No. 98934144.1, EP Office Action mailed Jun. 27, 2005", 4 pgs.

"International Application Serial No. 98934144.1, European Search Report mailed Jun. 27, 2005", 2 pgs.

"International Application Serial No. PCT/US2005/000041, International Preliminary Report on Patentability mailed Mar. 1, 2007", 8 pgs.

"International Application Serial No. PCT/US2005/000041, International Search Report mailed Jun. 3, 2005", 6 pgs.

"International Application Serial No. PCT/US2005/000041, Written Opinion mailed Jun. 3, 2005", 6 pgs.

"International Application Serial No. PCT/US98/12604, International Search Report mailed Oct. 19, 1998", 5 pgs.

Lehnert, A. M, et al., "Pancreatic Islet Xenograft Tolerance after Short-Term Costimulation Blockade is Associated with Increased CD4+ T Cell Apoptosis but not Immune Deviation", *Transplantation* (Baltimore), vol. 69, (6), ISSN: 0041-1337, (Mar. 27, 2000), 1176-1185.

"U.S. Appl. No. 11/457,374, Non-Final Office Action mailed Sep. 3, 2008", 13 pgs.

"Chinese Application Serial No. 200580005139.4, Office Action mailed Sep. 5, 2008", 10 pgs.

"Indian Application Serial No. 1926/KOLNP/2006, Examiner's Report mailed Sep. 15, 2008", 6 pgs.

"U.S. Appl. No. 09/992,979—312 Amendment filed Feb. 13, 2006", 16 pgs.

"U.S. Appl. No. 09/992,979—Advisory Action mailed Sep. 13, 2005", 3 pgs.

"U.S. Appl. No. 09/992,979—Comment on Statement of Reasons for Allowance", 2 pgs.

"U.S. Appl. No. 09/992,979—Notice of Allowance mailed Jan. 12, 2006", 10 pgs.

"U.S. Appl. No. 09/992,979—PTO Response mailed May 24, 2006 to Rule 312 Communication filed Feb. 13, 2006", 2 pgs.

"U.S. Appl. No. 09/992,979—PTO Response mailed Oct. 12, 2006 to Rule 312 Communication filed Feb. 13, 2006", 2 pgs.

"New Zealand Application Serial No. 548445, Subsequent Examintion Report Mailed Oct. 31, 2008", 2 pgs.

U.S. Appl. No. 11/457,374, Response filed Mar. 3, 2009 to Non Final Office Action mailed Sep. 3, 2008, 7 pgs.

* cited by examiner

FIGURE 8 ent or the patent disclosure, as it appears in the Patent and
SYSTEMS, METHODS, INTERFACES AND SOFTWARE FOR EXTENDING SEARCH RESULTS BEYOND INITIAL QUERY-DEFINED BOUNDARIES

CROSS-REFERENCE TO RELATED APPLICATION

This application claims priority to U.S. provisional application 60/533,819 filed on Dec. 31, 2003. The provisional application is incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright® 2003, Thomson Global Resources AG.

TECHNICAL FIELD

Various embodiments of the present invention concern information-retrieval systems, such as those that provide legal documents or other related content.

BACKGROUND

The American legal system, as well as some other legal systems around the world, relies heavily on written judicial opinions, the written pronouncements of judges, to articulate or interpret the laws governing resolution of disputes. Each judicial opinion is not only important to resolving a particular legal dispute, but also to resolving similar disputes, or cases, in the future. Because of this, judges and lawyers within our legal system are continually researching an ever-expanding body of past opinions, or case law, for the ones most relevant to resolution of disputes.

To facilitate these searches West Publishing Company of St. Paul, Minn. (doing business as Thomson West) collects judicial opinions from courts across the United States, and makes them available electronically through its Westlaw™ information-retrieval system. (Westlaw is a trademark of Thomson West.) Many of these opinions are published with bibliographic cites or hyperlinks to other opinions, that rely on or criticize various points of law in these opinions. The cites and hyperlinks enable researchers to find printed volumes containing the related opinions or readily access the related opinions electronically over a computer network. The Westlaw system empowers users to search over 100 million documents.

At least one problem the present inventors recognized with this effective and highly successful system is that there are numerous other types of documents, other than opinions, that may be of use to legal researchers, but are frequently overlooked. For example, some users do not take full advantage of the West Key Number™ System, which provides classified summaries of legal points, made in judicial opinions. (West Key Number is a trademark of Thomson West.) The summaries, known as headnotes, are classified into more than 90,000 distinct legal categories, and can be used for a variety of purposes, such as evaluating the relevance of legal opinions to particular legal issues. Others overlook secondary resources, such as American Law Reports (ALR), which includes about 4,000 in-depth scholarly articles, each teaching about a separate legal issue.

Accordingly, the present inventors have recognized a need for improvement of the information-retrieval systems for legal documents.

SUMMARY

To address this and/or other needs, the present inventors devised systems, methods, and software that facilitate the retrieval of related non-opinion legal documents in response to queries for legal opinions. One exemplary system automatically submits a user query for legal opinions to first and second databases, with the first storing legal opinions and the second storing non-opinion documents, such as headnotes from the West Key Number System, articles from American Law Reports, and/or articles from American Jurisprudence. A first search engine in the system searches the first database for relevant legal opinions based on the query. A second search engine searches the second database twice: the first time based on the user query and the second time based on results from the first search engine. In some embodiments, the first search engine is a conventional tf-idf (term-frequency-inverse-document-frequency) search engine, and the second search engine is a composite vector-based classifier. Results from both the first and second databases are presented to the user via a graphical user interface, which displays them in separate regions, panes, or windows.

In other embodiments, the second database provides topical treatises, state practice guides, statutes, and/or law review articles to augment searches of caselaw database. Also, other embodiments augment statute searches, regulatory searches, secondary-material searches, and news searches. Some embodiments charge a separate or additional fee for accessing documents from the second database.

DETAILED DESCRIPTION OF EXEMPLARY EMBODIMENTS

This description, which references and incorporates the above-identified Figures, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Additionally, this document incorporates by reference U.S. Provisional Patent Application 60/436,191, which was filed on Dec. 23, 2002; U.S. patent application Ser. No. 10/027,914, which was filed on Dec. 21, 2001; U.S. Provisional Patent Application 60/437,169, which was filed on Dec. 30, 2002; and U.S. Provisional Patent Application 60/480,476, which was filed on Jun. 19, 2003. One or more embodiments of the present application may be combined or otherwise augmented by teachings in the referenced applications to yield other embodiments.

Exemplary Information-Retrieval System

Figure 1:
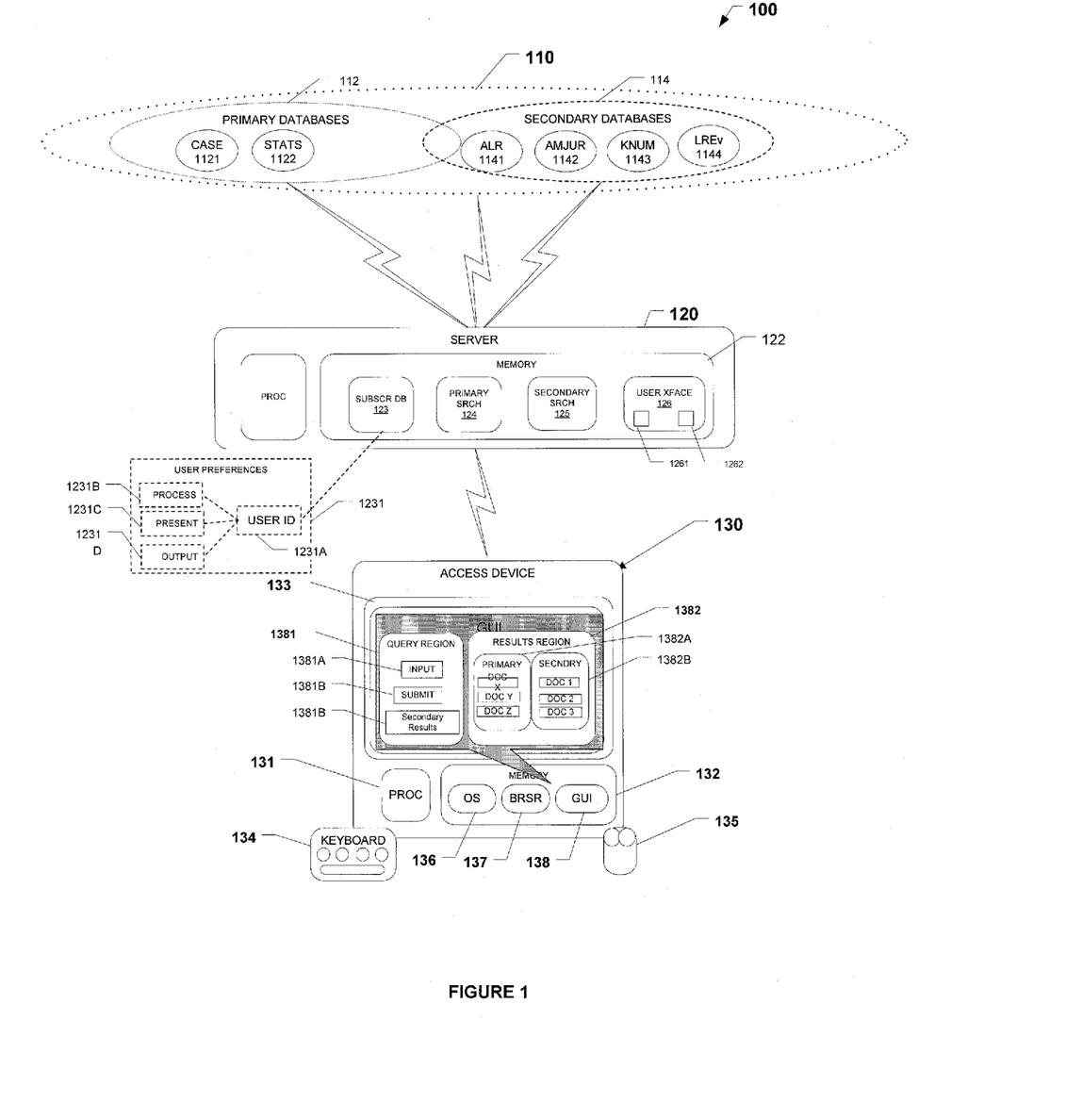
FIG. 1 is a diagram of an exemplary information-retrieval system 100 corresponding to one or more embodiments of the invention.

FIG. 1 shows an exemplary online information-retrieval system 100. System 100 includes one or more databases 110, one or more servers 120, and one or more access devices 130.

Databases 110 includes a set of primary databases 112 and a set of second databases 114. Primary databases 112, in the exemplary embodiment, include a caselaw database 1121 and a statutes database 1122, which respectively include judicial opinions and statutes from one or more local, state, federal, and/or international jurisdictions. Secondary databases 114, which contain legal documents of secondary legal authority or more generally authorities subordinate to those offered by judicial or legislative authority in the primary database, includes an ALR (American Law Reports) database, 1141, an AMJUR database 1142, a West Key Number (KNUM) Classification database 1143, and a law review (LREV) database 1144. Other embodiments may include non-legal databases that include financial, scientific, or health-care information. Also, in some embodiments, primary and secondary connote the order of presentation of search results and not necessarily the authority or credibility of the search results.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a primary search module 124, secondary search module 125, and a user-interface module 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, primary search module 124, secondary search module 125, and user-interface module 126.

Subscriber database 123 includes subscriber-related data for controlling, administering, and managing pay-as-you-go or subscription-based access of databases 110. In the exemplary embodiment, subscriber database 123 includes one or more preference data structures, of which data structure 1231 is representative. Data structure 1221 includes a customer or user identifier portion 1231A, which is logically associated with one or more secondary search preferences, such as preferences 1231B, 1231C, and 1231D. Preference 1231B includes a default value governing whether supplemental searching is enabled or disabled when searching select databases, such as case-law databases. Preference 1231C includes a default value governing presentation of supplemental of secondary search results, for example, the listing priority of various content types or the maximum number of such results to display. Preference 1231D includes a default value governing which among two or more secondary search algorithms or acceptance criteria are used during secondary searching. (In the absence of a temporary user override, for example, an override during a particular query or session, the default value for the supplemental search preferences govern.)

Primary search module 124 includes one or more search engines and related user-interface components, for receiving and processing user queries against one or more of databases 110. In the exemplary embodiment, one or more search engines associated with search module 124 provide Boolean, tf-idf, natural-language search capabilities.

Secondary search module 125 includes one or more search engines for receiving and processing queries against one or more of databases 110. In the exemplary embodiment, secondary search module 125 provides a composite vector-based classification search using a user query and/or results from primary search module 124. In other embodiments, the second database provides topical treatises, state practice guides, statutes, and/or law review articles to augment searches of caselaw database. Also, other embodiments augment statute searches, regulatory searches, secondary-material searches, and news searches. Some embodiments charge a separate or additional fee for accessing documents from the second database.

User-interface module 126 includes machine readable and/or executable instruction sets for wholly or partly defining web-based user interfaces, such as search interface 1261 and results interface 1262, over a wireless or wireline communications network on one or more accesses devices, such as access device 130.

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module which includes one or more processors (or processing circuits) 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120.)

More specifically, graphical user interface 138 defines or provides one or more display regions, such as a query or search region 1381 and a search-results region 1382. Query region 1381 is defined in memory and upon rendering includes one or more interactive control features (elements or widgets), such as a query input region 1381A, a query submission button 1381B, and a secondary search selection 1381C. Search-results region 1382 is also defined in memory and upon rendering includes a primary results region 1382A and a secondary results region 1382B. Region 1382A includes one or more interactive control features, such as features A1, A2, A3 for accessing or retrieving one or more corresponding primary search result documents from one or more of databases 110 via server 120. Each control feature includes a respective document identifier or label, such as DOC X, DOC Y, DOC Z identifying respective titles and/or citations for the corresponding documents. Region 1382B includes one or more interactive control features, such as features B1, B2, B3 for accessing or retrieving one or more corresponding secondary search result documents from one or more of databases 110 via server 120. Each control feature includes a respective document identifier or label, such as DOC 1, DOC 2, DOC 3 identifying respective titles and/or citations for the corresponding documents.

In the exemplary embodiment, each of these control features takes the form of a hyperlink or other browser-compatible command input, and provides access to and control of query region 1381 and search-results region 1382. User selection of the control features in region 1382 results in retrieval and display of at least a portion of the corresponding document within a region of interface 138 (not shown in this figure.) Although FIG. 1 shows query region 1381 and results region 1382 as being simultaneously displayed, some embodiments present them at separate times. Additionally or alternatively, some embodiments intermingle the primary and secondary results within region 1382. Some variants of these embodiments present the secondary results in a font that visibly distinguishes them from the primary results and/or in combination with an icon that indicates them as being secondary or supplemental.

Exemplary Operation

Figure 2:
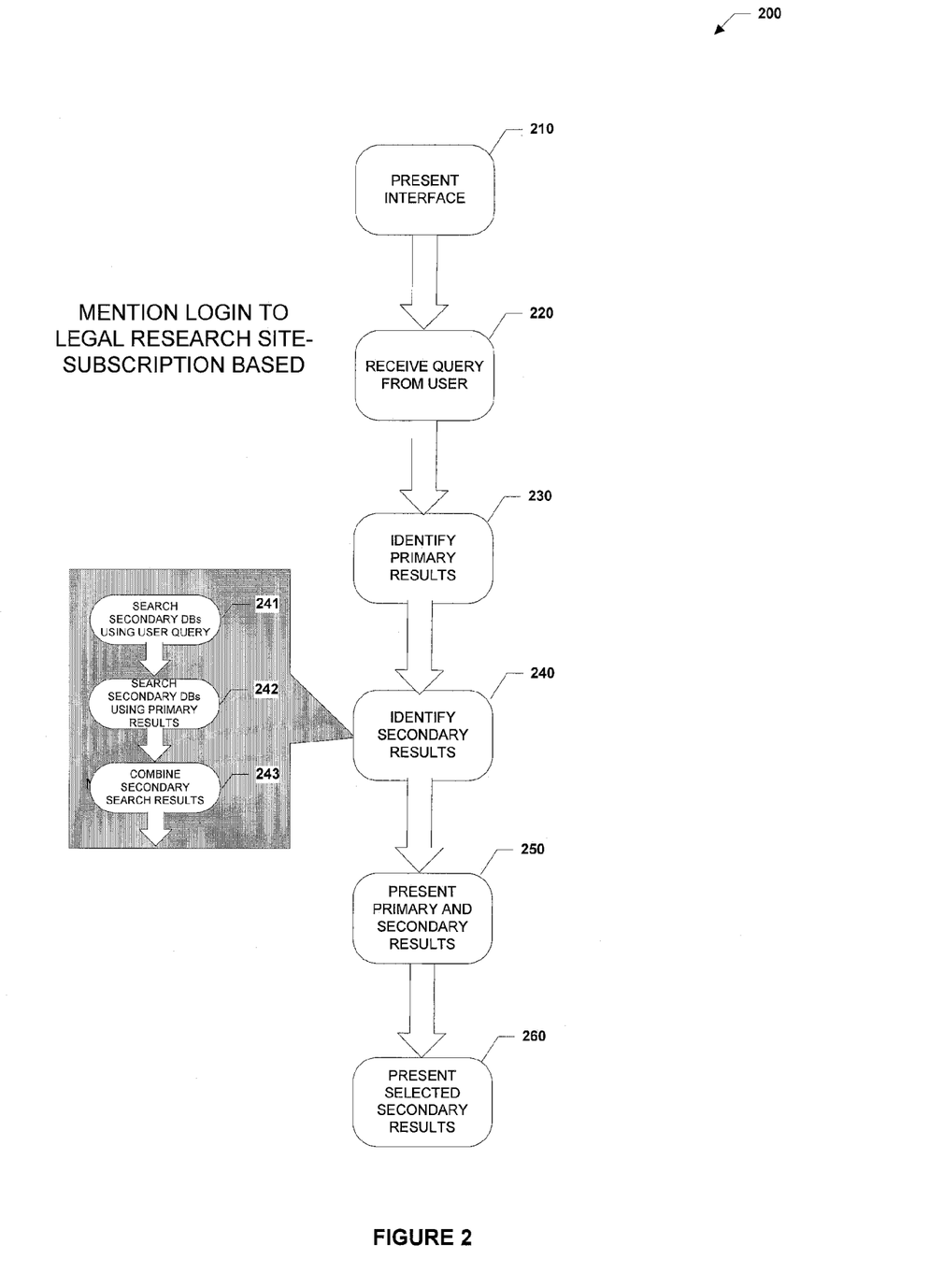
FIG. 2 is a flowchart corresponding to one or more exemplary methods of operating system 100 and one or more embodiments of the invention.

FIG. 2 shows a flow chart 200 of one or more exemplary methods of operating a system, such as system 100. Flow chart 200 includes blocks 210-270, which, like other blocks in this description, are arranged and described in a serial sequence in the exemplary embodiment. However, some embodiments execute two or more blocks in parallel using multiple processors or processor-like devices or a single processor organized as two or more virtual machines or sub processors. Some embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow (in FIG. 2 and elsewhere in this description) applies to software, hardware, and firmware implementations.

Block 210 entails presenting a search interface to a user. In the exemplary embodiment, this entails a user directing a browser in a client access device to internet-protocol (IP) address for an online information-retrieval system, such as the Westlaw system and then logging onto the system. Successful login results in a web-based search interface, such as interface 138 in FIG. 1 or interface 300 in FIG. 3 (or one or more portions thereof) being output from server 120, stored in memory 132, and displayed by client access device 130.

Figure 3:
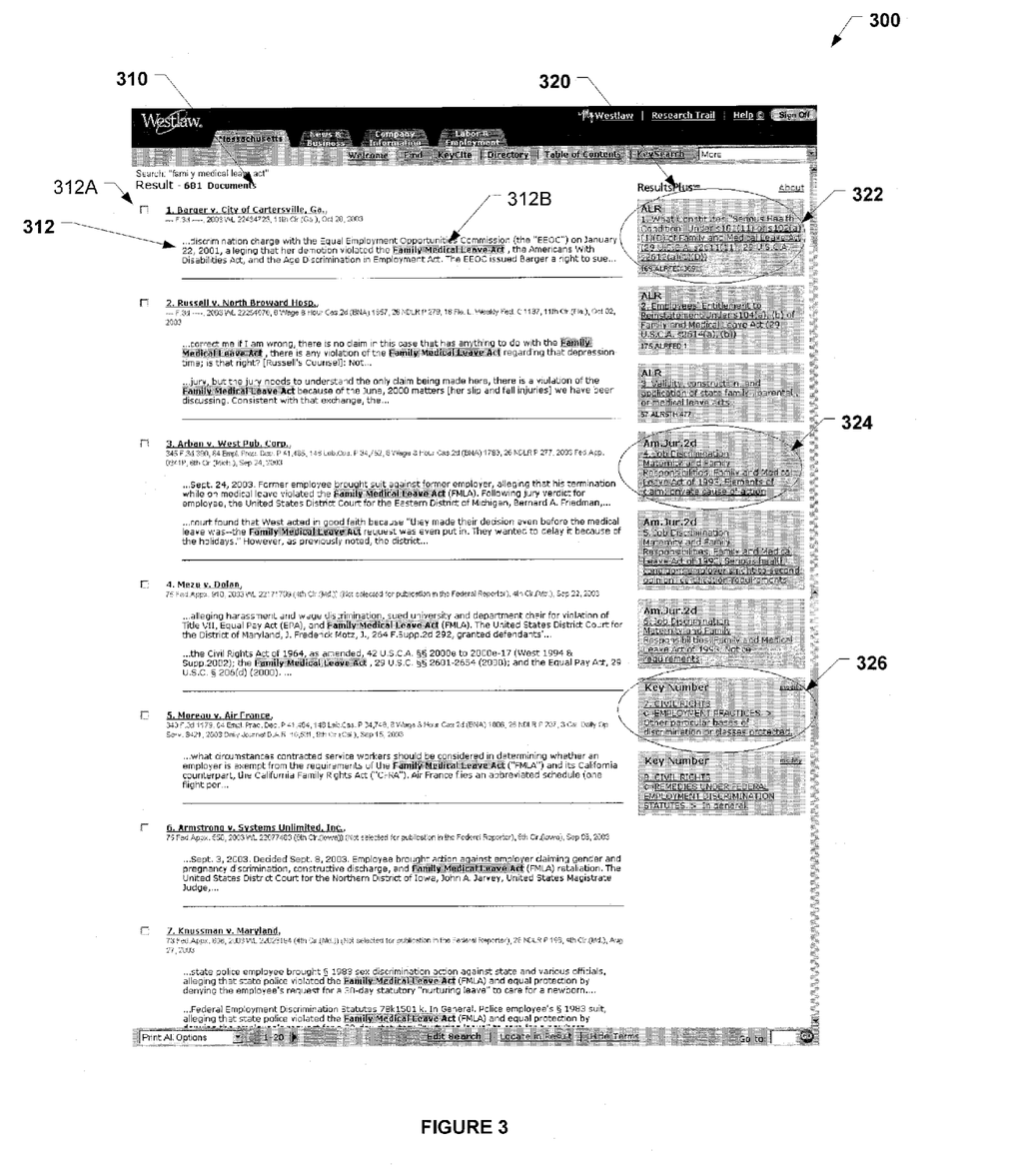
FIG. 3 is a facsimile of an exemplary query window 300 corresponding to one or more embodiments of the invention.

As shown in FIG. 3, interface 300 includes a number of interactive control features, including a query input region 310, a query-submit command 320, and a secondary directive region 330. Query input region 310 receives textual input defining a query. Secondary directive region 320 allows the user to specifically enable or disable searching of secondary databases or resources. The initial state of this directive region is determined by a default user preference value stored in a subscriber database, such as database 124. Changing the state of the directive region, in the exemplary embodiment, changes the directive for the current query; the default preference value is unaffected unless changed at a superior control level, such as via a preference control region. Some embodiments also include an interactive control feature, such as set of check boxes or a menu, that allows users to define preferences related to the display of secondary results. For example, one embodiment allows users to prioritize the display order of secondary results by content type, specifically which content type should be listed first. Query-submit command 320 allows a user to cause access device 130 to submit the query defined in input region 310 and the setting in secondary directive region 320 to a server, such as server 120.

Using interface 138 or 300, the user can define or submit a query and cause it to be output to a server, such as server 120. In other embodiments, a query may have been defined or selected by a user to automatically execute on a scheduled or event-driven basis. In these cases, the query may already reside in memory of a server for the information-retrieval system, and thus need not be communicated to the server repeatedly. Execution then advances to block 220.

Block 220 entails receipt of a query. In the exemplary embodiment, the query includes a query string and/or a set of target databases, which includes one or more of the select databases. In some embodiments, the query string includes a set of terms and/or connectors, and in other embodiment includes a natural-language string. Also, in some embodiments, the set of target databases is defined automatically or by default based on the form of the system or search interface. Also in some embodiments, the received query may be accompanied by other information, such as information defining whether to search secondary resources. In any case, execution continues at block 230.

Block 230 entails identifying a set of documents or search results based on or in response to the received query. In the exemplary embodiment, this entails the server or components under server control or command, executing the query against the targeted set of databases and identifying documents that satisfy the query criteria. Execution proceeds to block 240.

Block 240 entails identifying a set of one or more secondary documents based on the query. (In some embodiments, execution of the duplicate identification block is contingent on a default or selected user option that specifies whether to identify duplicate documents.) In the exemplary embodiment, secondary identification generally entails using a second search engine or more precisely a multi-classifier text classification engine to search a second database.

More specifically, the exemplary embodiment follows the method shown in flow chart 240, which includes process blocks 241-244. Block 241 entails searching the secondary databases based on the user query. In the exemplary embodiment, this search entails use of secondary search module, which includes composite vector based classifier. More particularly, some of the exemplary systems classify or aid manual classification of an input text by determining a set of composite scores, with each composite score corresponding to a respective document being considered for inclusion as a secondary search results and based on a "similarity or relevance score from one or more, preferably two or more, classifiers. Determining each score entails computing and applying class-specific weights to one or more of the following types of scores:

- a first type based on similarity of the query text (or primary result documents) to text associated with a respective one of documents in the secondary databases (potential secondary documents);
- a second type based on similarity of a set of Key Number classes associated with the query text and a set of Key Number classes associated with a respective one of the potential secondary documents;
- a third type based on probability of one of the potential secondary documents given a set of one or more Key Number classes associated with the query text; and
- a fourth type based on a probability of the query text given text (for example, headnotes) associated with a respective one of the potential secondary documents.

Deciding whether to include or exclude a particular document within the secondary search results entails evaluating each score against decision criteria, such as document-specific thresholds.

Block 242 entails searching the secondary databases based on results from the first search engine at block 230. In the exemplary embodiment, this search entails extracting text, such as noun-word pairs, from a subset of the documents of the primary search results to define a pool or set of features. The extracted text is then input into a text classifier, such as the multi-classifier engine note above, and compared to text of potentially related articles or more generally documents in the secondary databases. In the context of the text classifiers, potential documents in databases, such the ALR, AmJur, or Key Number headnote conglomerations are treated as classes. Those judged by the multi-classifier engine to be sufficiently similar to the other search results by virtue of meeting a similarity threshold are then included in the secondary search results. In some embodiments, a preset number of the most relevant documents from the primary search results—for example, the top 5 documents or the top 5% of documents—are used as a basis. Also, some embodiments may use a subset of the primary search results as a basis for a "more like this" type of search of the secondary databases. Execution continues at block 243.

Block 243 entails combining the results from the searches of the secondary databases into a secondary results set. In the exemplary embodiment, extended or secondary search results include ALRs, AmJur sections, and West Key Number System classifications codes (and/or associated headnotes) that are determined to be relevant to the query.

In the exemplary embodiment, the topical scope of the secondary databases is focused on legal materials. However, in some embodiments, any relevant domain of information can be searched, including for example, news and financial databases, professional directories, etc. In determining relevance of secondary database documents, some embodiments rely on customer-tracking or usage information in addition to the secondary search engine. This information ensures documents that are frequently used (that is, "clicked on,"), printed, and/or KeyCited after similar searches are more likely to be included within secondary results. Additionally, some embodiments use term location within a document as a factor in determining the relevance score or ranking of candidate secondary results. Execution continues at block 250.

Block 250 entails presenting results from primary and secondary databases to the user via a graphical user interface. In the exemplary embodiment, this entails displaying a listing of the secondary results in one or more separate regions, panes, or windows, adjacent to a listing of the primary results, with each listed document or more generally item, associated with a corresponding interactive control feature, such as hyperlink, that is selectable by a user to invoke retrieval and/or display of the associated document (or a portion thereof) in the same or separate window. See, for example, regions 1381 and 1382 in FIG. 1 or regions 310 and 320 in FIG. 3.

Some embodiments automatically limit the number of secondary items shown in the separate pane to a predetermined number of items, such as 10. Exemplary findings include links to documents from the American Law Reports (ALR) and American Jurisprudence 2d (AMJUR) databases, and West topic and key number references. (Some embodiment also excludes secondary result documents, such as ALR or AmJur documents, that have red KeyCite status flags (indicating that the documents have been superseded)). In addition, primary results that include case law and statutes may include links to treatises and law reviews. Some embodiments include an "expand" control feature which allows users to selectively extend the number and/or size of the displayed secondary results list and thus gain access to a more extended list of secondary results.

Block 260 entails presenting one or more of the secondary search results. In the exemplary embodiment, this entails a user clicking on one or more of the listed secondary search results and thereby causing access device 130 to initiate or submit a request for the one or more items. Depending on the access rights of the user, generally determined by subscription parameters, the user account is charged a fee for accessing the secondary search results. Some embodiments present an advisory message to the user regarding any assessment of fees, providing users an option to cancel access.

Figure 4:
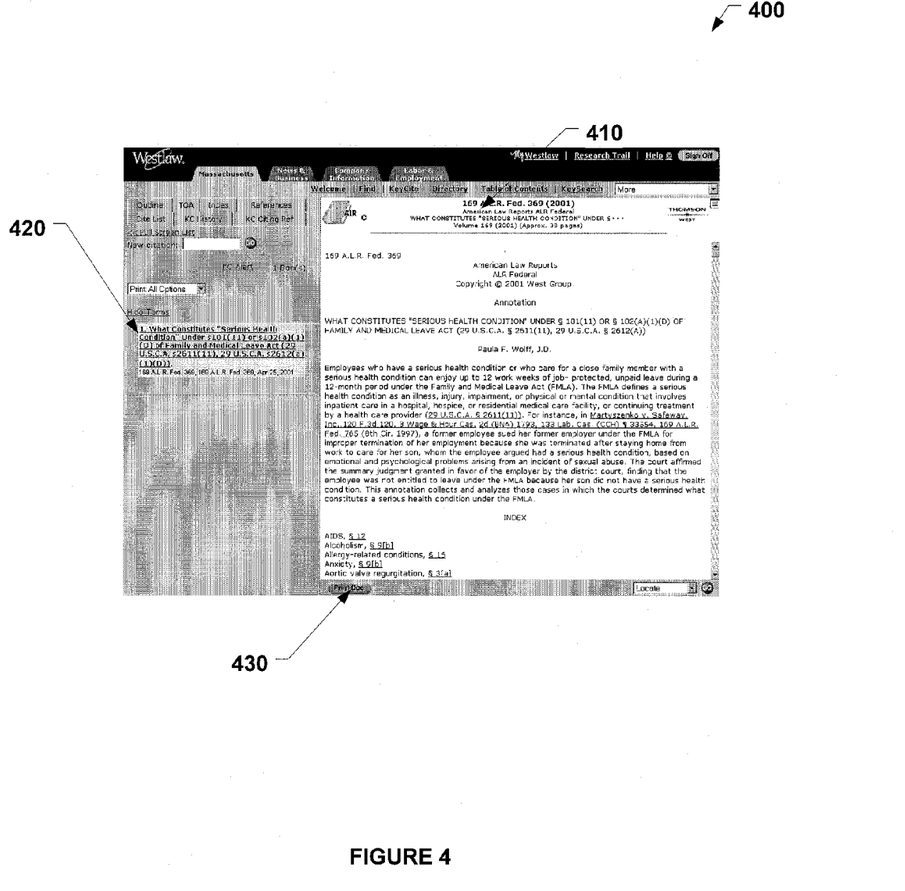
FIG. 4 is a facsimile of an exemplary user interface 400 corresponding to one or more embodiments of the invention.

For example, clicking on listed item 322 (in FIG. 3) results in presentation of a corresponding ALR article within an interface, such as interface 400 in FIG. 4. Interface 400 includes a document display region 410 which shows at least a portion of the corresponding ALR article, a document listing 420 which re-lists the identifying information for ALR article, and a print command input 430 which is selectable to cause print, email, or other output of the article for the user.

Figure 5:
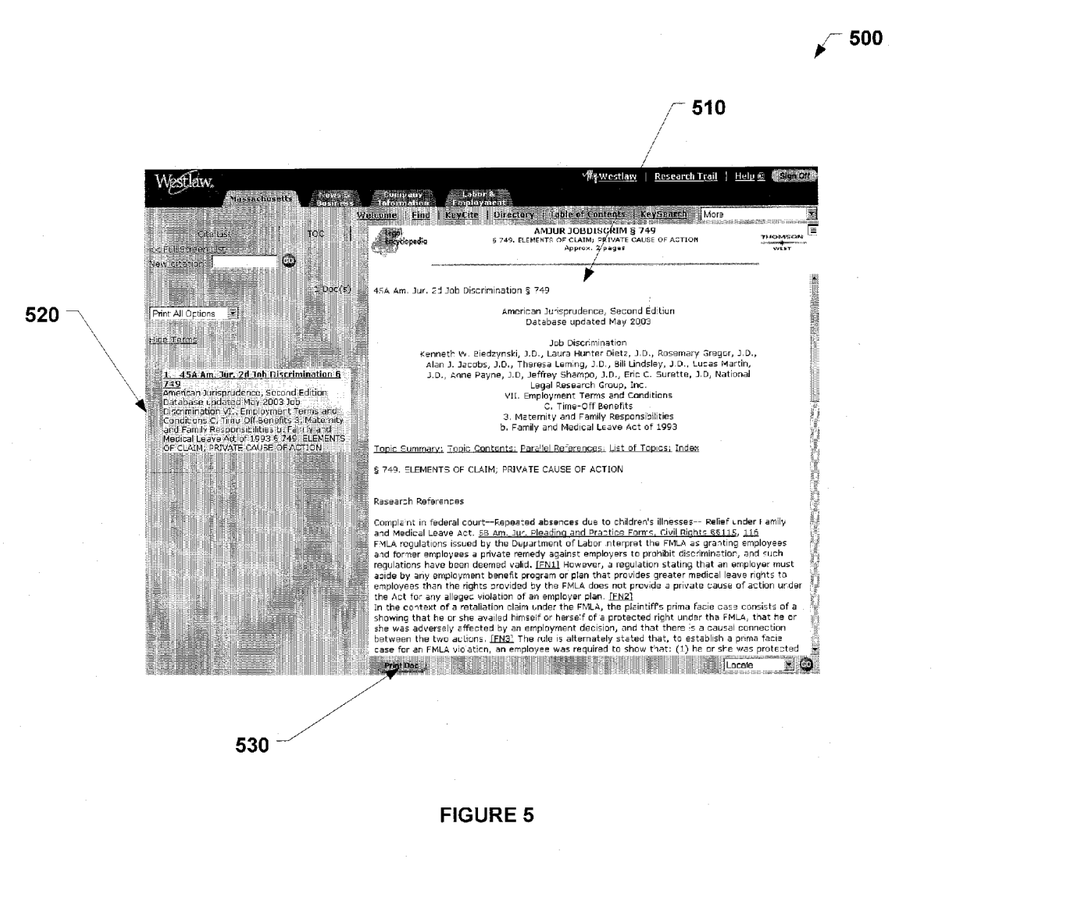
FIG. 5 is a facsimile of an exemplary user interface 500 corresponding to one or more embodiments of the invention.

Similarly, selecting or clicking on listed item 324 in FIG. 3 results in presentation of a corresponding AMJUR article within an interface, such as interface 500 in FIG. 5. Interface 500 includes a document display region 510 which shows at least a portion of the corresponding AMJUR article, a document listing 520 which re-lists the identifying information for the AMJUR article, and a print command input 530 which is selectable to cause print, email, or other output the article for the user.

Figure 6:
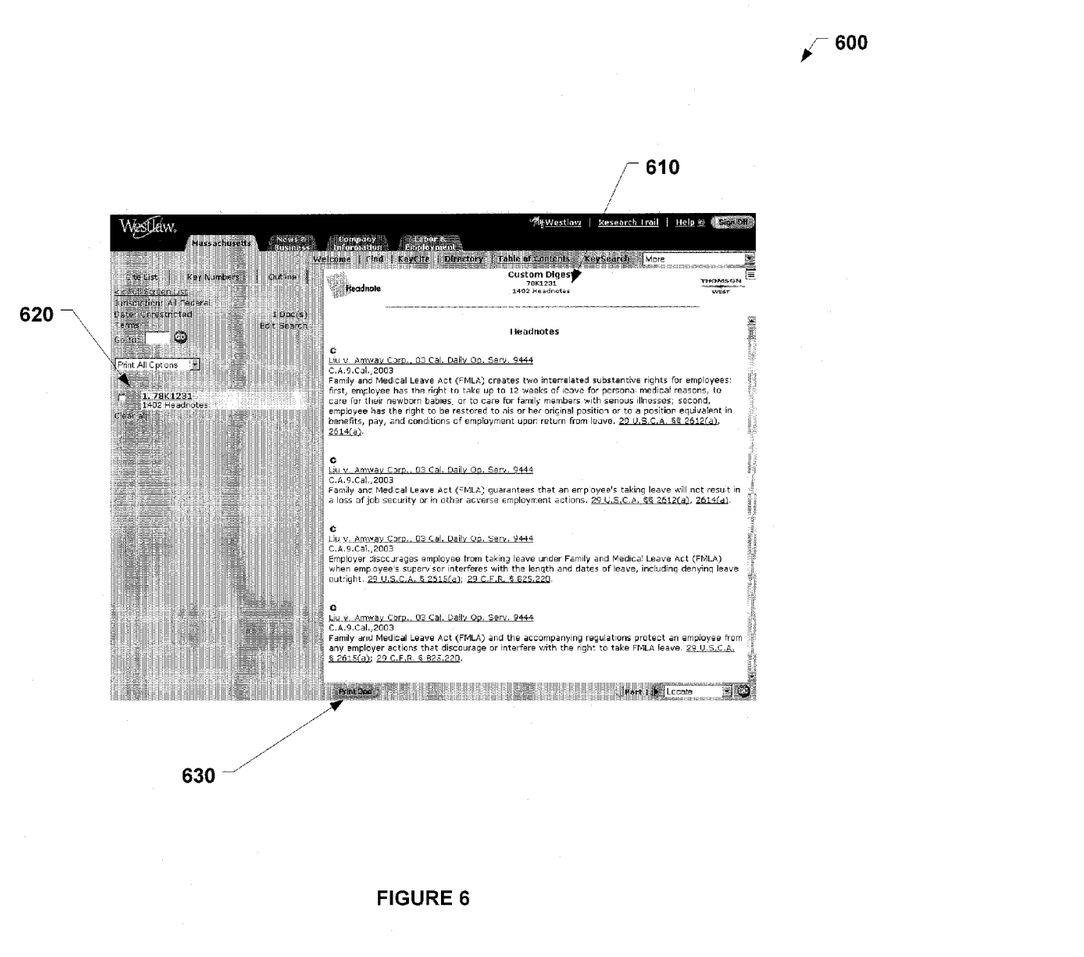
FIG. 6 is a facsimile of an exemplary user interface 600 corresponding to one or more embodiments of the invention.

Selecting listed item 326 in FIG. 3 results in presentation of an interface, such as an interface 600 in FIG. 6 that displays a custom digest page showing headnotes related to the West Key Number classification for listed item 326. Interface 600 includes a document display region 610 which shows at least a portion of the corresponding custom digest page, a document listing 620 which re-lists the identifying information for the West Key Number classification, and a print command input 530 which is selectable to print, email, or otherwise output the article.

After viewing the secondary search results, a user may redisplay the primary search results (and the secondary search results.) For example, the user may use the "back" button on her browser or activate a return or 'back' link on one of interface 400, 500, or 600.

Exemplary Architecture for Supplemental Search Function

Figure 7:
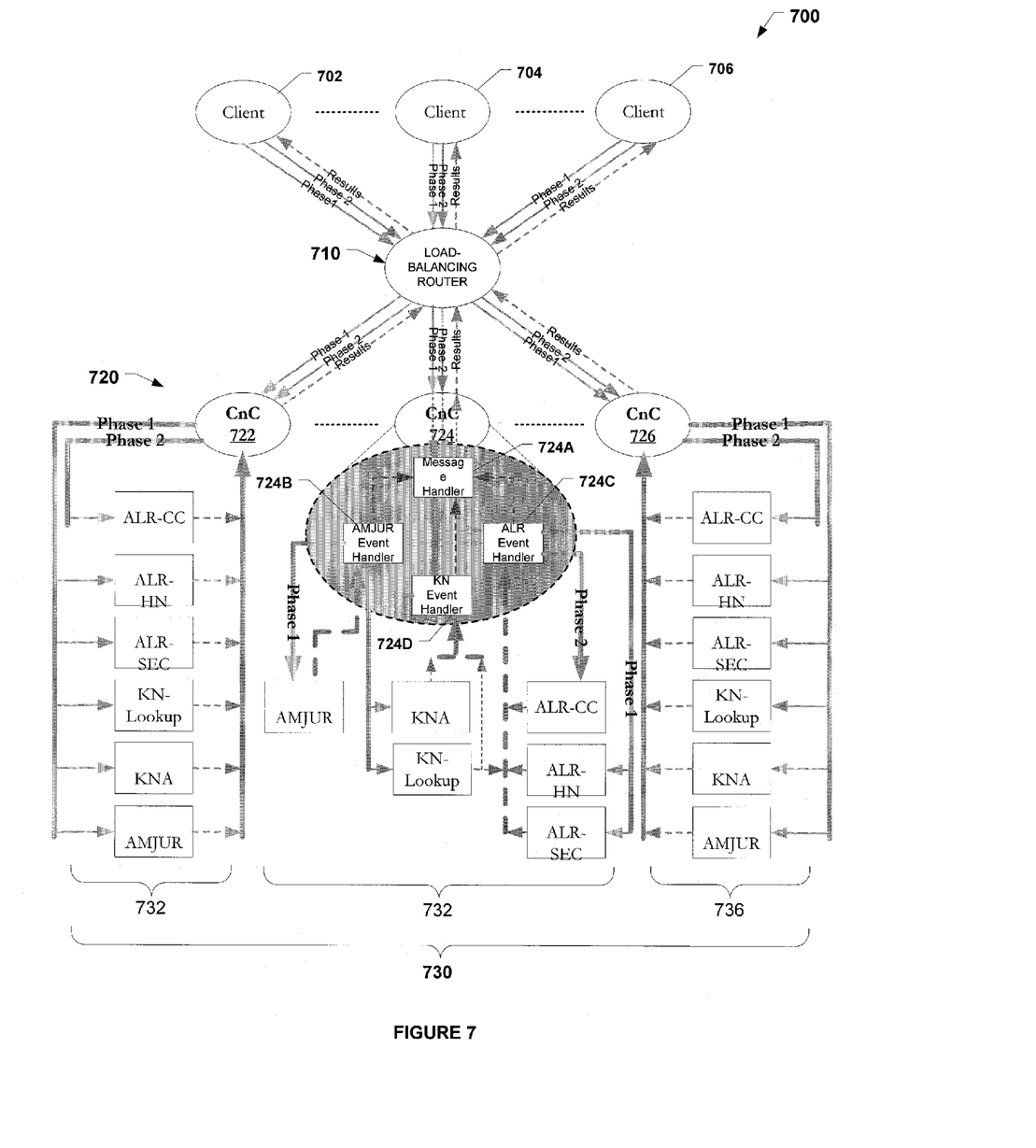
FIG. 7 is a diagram of an exemplary architecture and workflow for a secondary search module corresponding to one or more embodiments of the invention.

FIG. 7 shows an exemplary architecture 700 for implementing the supplemental searching function of server 120. The exemplary architecture includes a load-balancing router 710, command-and-control (CnC) services 720, and back-end search (or classification) service sets 730.

Specifically, load-balancing router 710 receives primary and secondary search requests from one or more clients, such as clients 702, 704, and 706. Router 710 sends queries to CnC services in a round-robin or other fashion, ensuring that both phases (i.e., the primary and secondary requests) of the same request are sent to the same back-end services set (or machine) and adding and subtracting machines from its services pool to reflect current availability. All requests/responses are encoded in XML prior to being forwarded to one of CnC services 720.

CnC services 720 include one or more independent CnC services, such as CnC services 722, 724, and 726. CnC service 724, which is generally representative of each CnC application service, includes a message handler 724A, an AMJUR event handler 724B, a Key Number (KN) event handler 724C, and an ALR event handler 724D. Each CnC service passes client messages to back-end services, combines the responses from back-end services 730 to generate the suggestions (or search results), and sends them back to the clients through router 710.

Back-end search service sets 730 includes classifier service sets 732, 734, and 736. Service set 734, which—in the exemplary embodiment—is generally representative of each classifier service set, includes AMJUR classifier (or search) service 744A, KNA classifier service 744B, KN-lookup service 744C, ALR-CC service 744D, ALR-HN service 744E, ALR-SEC service 744F. The name of each services reflects the relevant query area. For example, ALR-HN processes word-pair classifiers or feature sets extracted from all headnotes (HNs) cited in ALR. These back-end services "suggest" multiple information categories (for example, ALR annotations) within two processing phases. The first phase is based on directly on the user query, and the second phase is based on the retrieved cases by the primary search engine in response to the user query. The services and the CnC are available as web services and use XML-RPC (Remote Procedure Calls) to communicate with each other.

In the exemplary embodiment, a search query is sent to the secondary search module (phase 1) in parallel with or at the same time it is sent to the primary search module. In the second phase, retrieved cases (or other documents) are forwarded by the client to the appropriate CnC service once they become available. If the primary search does not retrieve any cases, the client sends an empty phase-two request because the router and the CnC service are expecting a phase-two request. The top row in the Figure represents Westlaw clients, with each client sending its phase-one (i.e., query text) and phase-two (i.e., resulting cases) requests to a router/load-balancer.

Exemplary Architecture for Classifier Services

Figure 8:
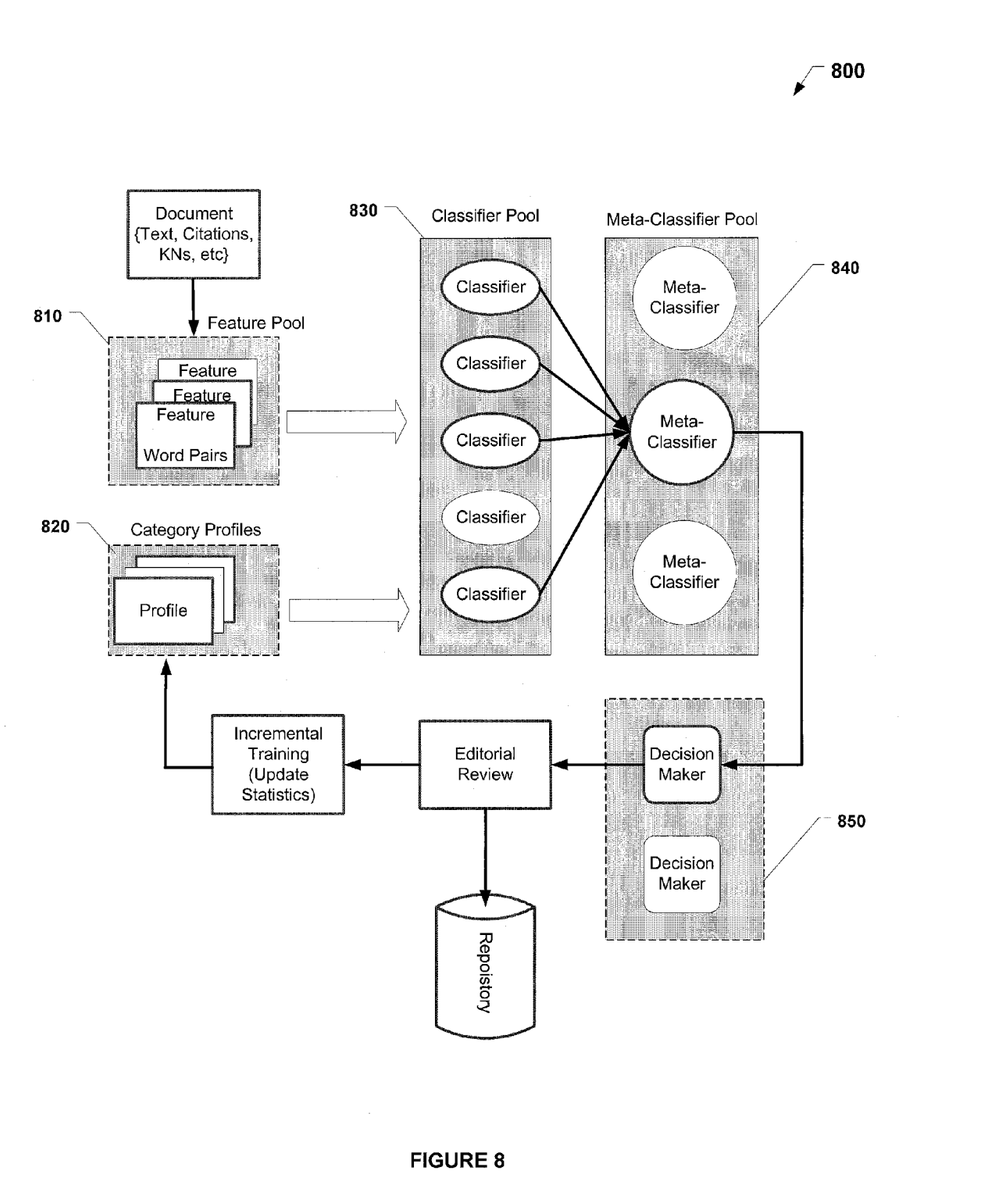
FIG. 8 is a diagram of an exemplary architecture or workflow for a text classifier that corresponds to one or more embodiments of the invention.

FIG. 8 shows an exemplary architecture 800 for implementing the multi-classifier used in exemplary system 100 and exemplary architecture 700. Architecture 800 includes a feature pool 810, a category pool 820, classifier pool 830, a meta-classifier pool 840, and a decision-maker pool 850.

CONCLUSION

In furtherance of the art, the inventors have presented various exemplary systems, methods, and software which, among other things, facilitate the supplementation of search results with additional information. One exemplary system automatically submits a user query for legal opinions to first and second databases, with the first storing legal opinions and the second storing non-opinion documents, such as headnotes from the West Key Number System, articles from American Law Reports, and/or articles from American Jurisprudence.

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. A system comprising:
    a server for an online legal-research provider, the server coupled to one or more databases containing law-related documents;
    a client access device coupled to the server via a network and having a display for presenting a graphical user interface including one or more user-interface elements configured or defined by the server, wherein one or more of the elements allows a user to define and submit one or more legal-research queries, with each of the queries having one or more associated search-boundary parameters, such as one or more terms, and/or database identifiers; and
    means associated with the server for returning search results to the client access device in response to a submitted query, wherein the search results include a first set of first documents and associated first user-interface elements, and a second set of second documents and associated second user-interface elements, wherein the first set of documents is within the boundaries of the submitted query and the second set of documents includes documents outside the boundaries of the submitted query;
    means for determining whether to include or exclude a candidate document in the second set of documents, the determining comprising evaluating each score in a set of composite scores for the candidate document against a set of decision criteria, wherein the candidate document is included in the second set of documents if the candidate document meets a similarity threshold associated with the second set of documents; and
    wherein the first and second user-interface elements cause the first and second results to be displayed as separate sets of results within a search-results-display portion of the graphical user interface.

2. The system of claim 1, wherein the graphical user interface is a Windows-type interface controlled by a browser application on the client access device.

3. The system of claim 1, including one or more machine-readable media storing one or more of components of the server, client access device, or graphical user interface.

4. The system of claim 1, wherein the means associated with the server comprises:
a first search engine configured to search a first database of legal opinions as a function of the submitted query; and
a second search engine configured to search a second database as a function of the submitted query and a result from the first search engine.

5. The system of claim 4, wherein the first search engine comprises a term-frequency-inverse-document-frequency search engine and the second search engine comprises a composite vector-based classifier.

6. The system of claim 1, wherein the databases include one or more of a case law database, a statute database, an American Law Reports database, an American Jurisprudence (AMJUR) database, a West Key Number Classification database, and a law review database.

7. The system of claim 1, wherein the display is configured to display the first results in a first type font and to display the second results in a second type font.

8. The system of claim 1, wherein the second user-interface element includes an icon on the display unit.

9. The system of claim 1, wherein the means associated with the server further comprise means for disabling a search of a select database, means for governing a presentation of secondary search results, and means for governing use of a secondary search algorithm.

10. A method of responding to a query from a user, comprising:
searching a first database comprising court legal opinions based on the query to identify a first set of one or more documents;
automatically identifying a second set of one or more documents in a second legal database comprising legal resources other than court legal opinions by inputting at least a portion of the query in a text classification engine which classifies text based on similarity to documents in the second database;
automatically determining whether to include or exclude a candidate document in the second set of one or more documents, the determining comprising evaluating each score in a set of composite scores for the candidate document against a set of decision criteria, wherein the candidate document is included in the second set of one or more documents if the candidate document meets a similarity threshold associated with the second set of one or more documents; and
outputting at least a portion of each of the first and the second set of documents to an access device associated with the user;
wherein
the searching a first database comprises using a search engine configured to search the first database as a function of the query;
the inputting at least a portion of the query in a text classification engine comprises using a second search engine configured to search a second database as a function of one or more of the query and a result from the first search engine; and
the first search engine comprises a term-frequency-inverse-document-frequency search engine and the second search engine comprises a composite vector-based classifier.

11. The method of claim 10, wherein the databases include one or more of a case law database, a statute database, an American Law Reports database, an American Jurisprudence (AMJUR) database, a West Key Number Classification database, and a law review database.

12. The method of claim 10, wherein the access device is configured to display the first results in a first type font and to display the second results in a second type font.

13. The method of claim 10, wherein one or more of the documents in the second set of documents is associated with an icon on the access device.

14. A method of responding to a query from a user, comprising:
searching a first database comprising court legal opinions based on the query to identify a first set of one or more documents;
automatically identifying a second set of one or more documents in a second legal database comprising legal resources other than court legal opinions by inputting a keyword associated with the first set of documents in a text classification engine which classifies text based on similarity to documents in the second database;
automatically determining whether to include or exclude a candidate document in the second set of one or more documents, the determining comprising evaluating each score in a set of composite scores for the candidate document against a set of decision criteria, wherein the candidate document is included in the second set of one or more documents if the candidate document meets a similarity threshold associated with the second set of one or more documents; and
outputting at least a portion of each of the first and the second set of documents to an access device associated with the user.

15. The method of claim 14, wherein
the searching a first database comprises using a first search engine configured to search the first database as a function of the query; and
the inputting at least a portion of the first set of documents in a text classification engine comprises using a second search engine configured to search the second database as a function of one or more of the query and a result from the first search engine.

16. The method of claim 15, wherein the first search engine comprises a term-frequency-inverse-document-frequency search engine and the second search engine comprises a composite vector-based classifier.

17. The method of claim 14, wherein the databases include one or more of a case law database, a statute database, an American Law Reports database, an American Jurisprudence (AMJUR) database, a West Key Number Classification database, and a law review database.

18. The method of claim 14, wherein the access device is configured to display the first set of documents in a first type font and to display the second set of documents in a second type font.

19. The method of claim 14, wherein one or more of the documents in the second set of documents is associated with an icon on the access device.

20. A method of responding to a query from a user, comprising:
using a processor for:
searching a first database comprising court legal opinions based on the query;
automatically searching a second legal database comprising legal resources other than court legal opinions using a keyword associated with text extracted from a result of the search of the first database;

initiating a transmission of a response to the user based on one or more of the searching a first database or the searching a second database; and automatically determining whether to include or exclude a candidate document in the response based on the searching of the second database, the determining comprising evaluating each score in a set of composite scores for the candidate document against a set of decision criteria, wherein the candidate document is included in the response based on the searching of the second database if the candidate document meets a similarity threshold associated with the response based on the searching of the second database.

21. The method of claim 20, wherein the searching a first database comprises using a first search engine configured to search the first database as a function of the query; and the searching a second database comprises using a second search engine configured to search the second database as a function of one or more of the query and a result from the first search engine.

22. The method of claim 20, wherein the databases include one or more of a case law database, a statute database, an American Law Reports database, an American Jurisprudence (AMJUR) database, a West Key Number Classification database, and a law review database.

23. The method of claim 20, comprising displaying a result from the searching a first database in a first type font and displaying a result from the searching a second database in a second type font.

24. The method of claim 20, wherein a result of the searching a second database is associated with an icon on an access device.

25. A method comprising:

presenting a search interface to a user for searching a first database comprising court legal opinions;

receiving a query from the user;

identifying a set of search results as a function of the query;

identifying a set of secondary search results from a second legal database comprising legal resources other than court legal opinions as a function of a keyword associated with text from the search results from the query;

automatically determining whether to include or exclude a candidate document in the set of secondary search results, the determining comprising evaluating each score in a set of composite scores for the candidate document against a set of decision criteria, wherein the candidate document is included in the set of secondary search results if the candidate document meets a similarity threshold associated with the set of secondary search results; and displaying the search results and the secondary search results.

26. The method of claim 25, comprising providing the user an option to disable a searching of secondary databases.

27. The method of claim 25, comprising providing the user an option to prioritize a display of the secondary search results.

28. The method of claim 25, comprising identifying the set of secondary search results using a composite vector-based classifier to generate the set of composite scores.

29. The method of claim 28, wherein the set of composite scores is determined as a function of one or more of:

a similarity of query text to text associated with a secondary database;

a similarity of Key Number classes associated with the query text and Key Number classes associated with a document in the secondary database;

a probability of a secondary document as a function of one or more Key Number classes associated with the query text; and a probability of the query text given text associated with a secondary document.

30. A computer-readable medium comprising instructions that when executed by a processor execute a process comprising:

searching a first database comprising court legal opinions based on a query to identify a first set of one or more documents;

automatically identifying a second set of one or more documents in a second legal database comprising legal resources other than court legal opinions by inputting a keyword associated with the first set of documents in a text classification engine which classifies text based on similarity to documents in the second database;

automatically determining whether to include or exclude a candidate document in the second set of one or more documents, the determining comprising evaluating each score in a set of composite scores for the candidate document against a set of decision criteria, wherein the candidate document is included in the second set of one or more documents if the candidate document meets a similarity threshold associated with the second set of one or more documents; and outputting at least a portion of each of the first and the second set of documents to an access device associated with a user.

31. The computer-readable medium of claim 30, wherein the access device is configured to display the first set of documents in a first type font and to display the second set of documents in a second type font.

32. The computer-readable medium of claim 30, wherein one or more of the documents in the second set of documents is associated with an icon on the access device.

33. A computer-readable medium comprising instructions that when executed by a processor execute a process comprising:

searching a first database comprising court legal opinions based on a query; and automatically searching a second legal database comprising legal resources other than court legal opinions using a keyword associated with text extracted from a result of searching the first database; and automatically determining whether to include or exclude a candidate document in a response based on the searching of the second database, the determining comprising evaluating each score in a set of composite scores for the candidate document against a set of decision criteria, wherein the candidate document is included in the response based on the searching of the second database if the candidate document meets a similarity threshold associated with the response based on the searching of the second database.

34. The computer-readable medium of claim 33, comprising instructions for displaying a result from the searching a first database in a first type font and displaying a result from the searching a second database in a second type font.

35. The computer-readable medium of claim 33, wherein a result of the searching a second database is associated with an icon on an access device.

36. A computer-readable medium comprising instructions that when executed by a processor execute a process comprising:
- presenting a search interface to a user for searching a first database comprising court legal opinions;
- receiving a query from the user;
- identifying a set of search results from a second legal database comprising legal resources other than court legal opinions as a function of the query;
- identifying a set of secondary search results as a function of a keyword associated with text from the search results from the query;
- automatically determining whether to include or exclude a candidate document in the set of secondary search results, the determining comprising evaluating each score in a set of composite scores for the candidate document against a set of decision criteria, wherein the candidate document is included in the set of secondary search results if the candidate document meets a similarity threshold associated with the set of secondary search results; and
- displaying the search results and the secondary search results.

37. The computer-readable medium of claim 36, comprising instructions for providing the user an option to disable a searching of secondary databases.

38. The computer-readable medium of claim 36, comprising instructions for providing the user an option to prioritize a display of the secondary search results.

39. The computer-readable medium of claim 36, comprising instructions for identifying the set of secondary search results using a composite vector-based classifier to generate the set of composite scores.

40. The computer-readable medium of claim 39, wherein the set of composite scores is determined as a function of one or more of:
- a similarity of query text to text associated with a secondary database;
- a similarity of Key Number classes associated with the query text and Key Number classes associated with a document in the secondary database;
- a probability of a secondary document as a function of one or more Key Number classes associated with the query text; and
- a probability of the query text given text associated with a secondary document.

* * * * *